United States Patent
Nam

(10) Patent No.: US 8,596,114 B2
(45) Date of Patent: Dec. 3, 2013

(54) SYSTEM AND METHOD FOR MONITORING EXHAUST GAS RECIRCULATION

(75) Inventor: Kihoon Nam, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/610,323

(22) Filed: Sep. 11, 2012

(65) Prior Publication Data

US 2013/0145831 A1 Jun. 13, 2013

(30) Foreign Application Priority Data

Dec. 9, 2011 (KR) .................. 10-2011-0132269

(51) Int. Cl.
*G01M 15/10* (2006.01)
(52) U.S. Cl.
USPC ........................................................ 73/114.74
(58) Field of Classification Search
USPC ........................................................ 73/114.74
See application file for complete search history.

(56) References Cited

U.S. PATENT DOCUMENTS

| | | | | |
|---|---|---|---|---|
| 7,066,160 | B2 * | 6/2006 | Matsumoto | 123/568.16 |
| 7,100,586 | B2 * | 9/2006 | Matsumoto | 123/568.16 |
| 8,108,129 | B2 * | 1/2012 | Nakayama et al. | 701/108 |
| 8,196,404 | B2 * | 6/2012 | Onishi et al. | 60/605.2 |
| 8,346,462 | B2 * | 1/2013 | Nakamura et al. | 701/114 |
| 8,397,700 | B2 * | 3/2013 | Kawase et al. | 123/568.16 |
| 8,423,269 | B2 * | 4/2013 | Harden et al. | 701/108 |
| 8,453,446 | B2 * | 6/2013 | Onishi et al. | 60/605.2 |
| 2010/0031939 | A1 * | 2/2010 | Ono | 123/568.22 |
| 2012/0095664 | A1 * | 4/2012 | Nakamura et al. | 701/102 |
| 2012/0312001 | A1 * | 12/2012 | Nam | 60/299 |
| 2012/0312283 | A1 * | 12/2012 | Nam | 123/568.11 |

FOREIGN PATENT DOCUMENTS

JP 2011-226438 A 11/2011

* cited by examiner

*Primary Examiner* — Freddie Kirkland, III
(74) *Attorney, Agent, or Firm* — Morgan, Lewis & Bockius LLP

(57) ABSTRACT

A method and a system for monitoring exhaust gas recirculation are provided that measures a state of an engine, judges an applied system between a high-pressure EGR system and a low-pressure EGR system according to the measured state of the engine, and judges whether a system is erroneous by measuring the position of an EGR valve of an unapplied EGR system and comparing the position with a predetermined reference position.

12 Claims, 9 Drawing Sheets

SYSTEM AND METHOD FOR MONITORING EXHAUST GAS RECIRCULATION

CROSS-REFERENCE TO RELATED APPLICATION

The present application claims priority to Korean Patent Application No. 10-2011-0132269 filed in the Korean Intellectual Property Office on Dec. 9, 2011, the entire contents of which is incorporated herein for all purposes by this reference.

BACKGROUND OF THE INVENTION

1. Field of the Invention

The present invention relates to a method and a system for monitoring exhaust gas recirculation. More particularly, the present invention relates to a method and a system for monitoring exhaust gas recirculation that can improve reliability of an EGR system in order to solve problems by accurately and rapidly monitoring an error of the EGR system.

2. Description of Related Art

Primary air pollutants of a diesel vehicle are nitrogen oxide (NOx) and particulate matter. Therefore, they become primary target matters for regulating exhaust gas of the diesel vehicle.

An exhaust gas recirculation (EGR) for reducing nitrogen oxide (NOx) has a characteristic of decreasing a combustion temperature by decreasing the density of an intake mixer without changing an air-fuel ratio of the mixer itself by making some of exhaust gas discharged after combustion contained in the intake mixer and flow into a combustion chamber.

That is, in the EGR device, in the case where emission such as NOx need be reduced according to an operation state of the engine, when some of the exhaust gas is provided to an intake through an EGR valve to flow into the combustion chamber together with the mixer, the volume of the exhaust gas that flows into the combustion chamber as inert gas is not changed. Therefore, the density of the mixer is relatively reduced, and as a result, a transmission speed of flames is reduced, thereby reducing a combustion speed. Accordingly, a combustion temperature is prevented from being raised to reduce the amount of generated emission such as NOx.

The EGR may be divided into a low-pressure EGR (LP EGR) system that recirculates exhaust gas passing through a turbine of a turbocharger through an intake passage at a front end of a compressor and a high-pressure EGR (HP EGR) that extracts exhaust gas between an exhaust manifold and the turbine and recirculates exhaust gas through the intake passage at a rear end of the compressor and an intercooler, as illustrated in FIG. 1.

It is monitored whether the high-pressure or low-pressure EGR system is erroneous by adopting two schemes in the related art.

That is, two schemes include an EGR monitoring scheme using a manifold absolute pressure sensor (MAP sensor) and an EGR monitoring scheme using a temperature sensor.

In the former scheme using the MAP sensor, a load variation is sensed by forcibly driving the EGR valve under a fuel supply interruption condition to sense a malfunction of the EGR device, and in the latter scheme using the temperature sensor, a temperature when the EGR valve operates is sensed by mounting the temperature sensor outside the EGR valve to sense the malfunction of the EGR device.

The scheme using the MAP sensor measures the amount of air that flows into an engine by detecting negative pressure of an intake manifold with electricity and thus is very sensitive to variation in electric resistance and cannot accurately sense a variation in the negative pressure depending on forcible driving of the EGR valve. The latter scheme using the temperature sensor senses the temperature of exhaust gas that passes through the EGR valve and thus has a problem that a response processing time is delayed and durability of the sensor itself deteriorates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system for monitoring exhaust gas recirculation that can accurately and rapidly monitor an error of an EGR system by enhancing an existing EGR system monitoring scheme.

In an aspect of the present invention, a method for monitoring exhaust gas recirculation in a dual EGR system, may include (a) measuring a state of an engine including information on rpm of the engine and a fuel quantity, (b) judging an applied EGR system and an unapplied EGR system between a high-pressure EGR system and a low-pressure EGR system according to the measured state of the engine, (c) measuring a position of an EGR valve of the unapplied EGR system when the applied EGR is judged, and (d) judging whether the system is erroneous by comparing a measured position of the EGR valve with a predetermined reference position.

The method may further include (e) shutting off the applied system when the system is judged to be erroneous in step (d).

The applied EGR system is open loop-controlled according to the judgment of step (b).

The step (d) may include judging whether a difference between the measured position of the EGR valve and the predetermined reference position deviates from a normal range, judging whether a time when the difference deviates from the normal range is maintained as long as a predetermined time, counting, as an error, a case where the time is maintained as long as the predetermined time, and judging the EGR system in an error situation when the number of times of error count is more than a predetermined number of times.

The step (d) may further include judging whether the error situation is healed after the error counting and judging that the system is erroneous when the error situation is maintained for a predetermined time with the error situation unhealed.

A predetermined warning is outputted when it is judged that the system is erroneous in step (e).

In another aspect of the present invention, a system for monitoring exhaust gas recirculation in a dual EGR system, may include an engine state measuring unit measuring a state of an engine including information on rpm of the engine and a fuel quantity, an application system judging unit judging an applied EGR system and an unapplied EGR system between a high-pressure EGR system and a low-pressure EGR system according to the measured state of the engine, a valve position measuring unit measuring a position of an EGR valve of the unapplied EGR system when the applied EGR is judged, and a system error judging unit judging whether the system is erroneous by comparing the measured position of the EGR valve with a predetermined reference position.

The system may include a control unit shutting off the applied EGR system when the system error judging unit judges that the system is erroneous.

The control unit open loop-controls the applied EGR system according to a judgment of the application system judging unit.

The system error judging unit judges whether a difference between the measured position of the EGR valve and the predetermined reference position deviates from a normal range, judges whether a time when the difference deviates from the normal range is maintained as long as a predetermined time, counts, as an error, a case where the time is maintained as long as the predetermined time, and judges the EGR system in an error situation when the number of times of error count is more than a predetermined number of times.

The system error judging unit judges whether the error situation is healed after the error counting and judges that the system is erroneous when the error situation is maintained for a predetermined time with the error situation unhealed.

A predetermined warning is outputted when the system error judging unit judges that the system is erroneous.

According to exemplary embodiments of the present invention, since a method and a system for monitoring exhaust gas recirculation can judge a state of an EGR system which operates by using a dual EGR system, from the position of an EGR valve of an EGR system which does not operate, the method and the system can monitor the state of the EGR system rapidly and accurately in real time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
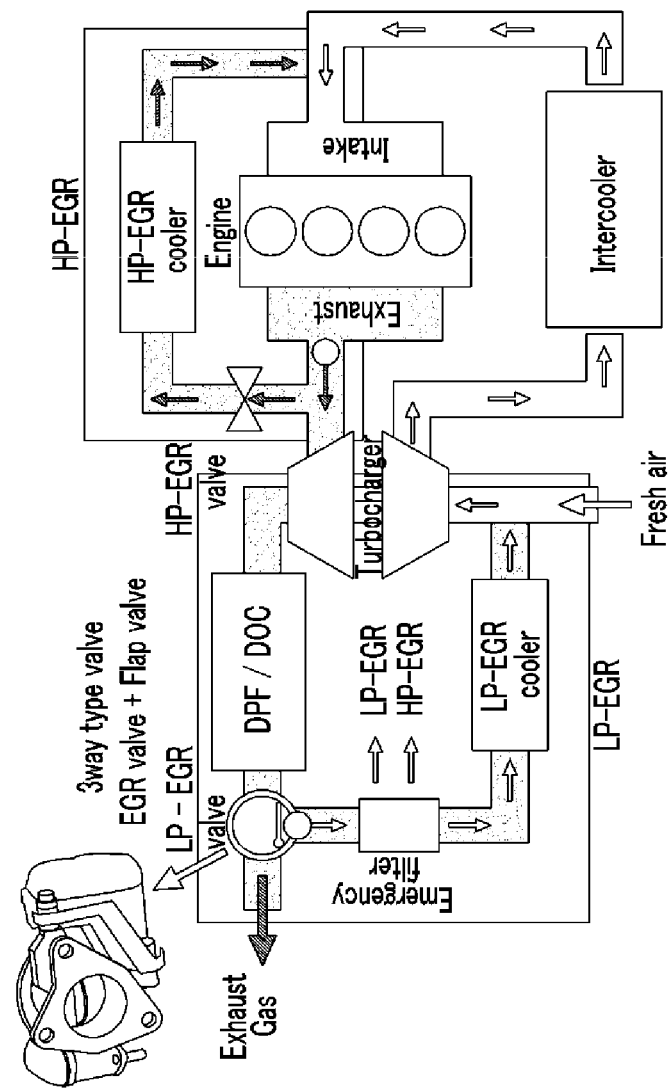
FIG. 1 is a configuration diagram of a dual EGR system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described below in detail with reference to the accompanying drawings.

Figure 2:
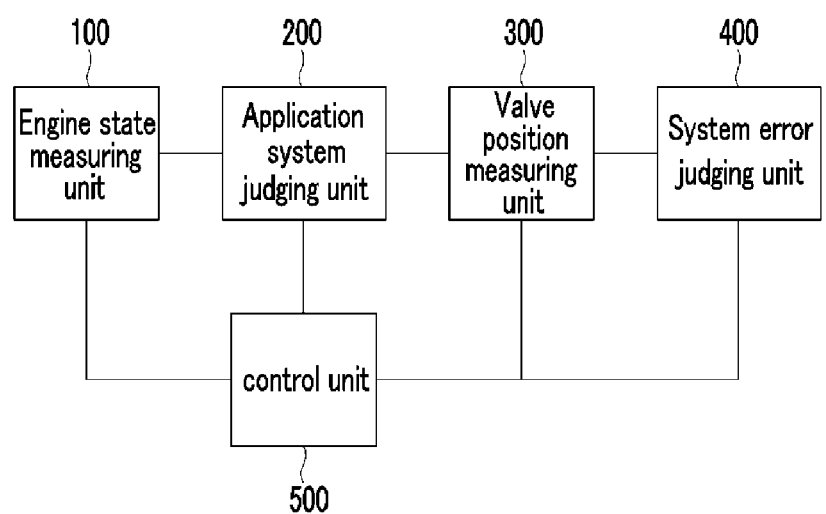
FIG. 2 is a configuration diagram of a system for monitoring exhaust gas recirculation according to an exemplary embodiment of the present invention.

FIG. 2 is a configuration diagram of a system 10 for monitoring exhaust gas recirculation according to an exemplary embodiment of the present invention. As illustrated in FIG. 2, the system 10 for monitoring exhaust gas recirculation according to the exemplary embodiment of the present invention may include, in a dual EGR system, an engine state measuring unit 100 measuring a state of an engine including information regarding rpm of the engine and a fuel quantity, an application system judging unit 200 judging an applied EGR system and an unapplied EGR system between a high-pressure EGR system and a low-pressure EGR system according to the measured state of the engine, a valve position measuring unit 300 measuring the position of an EGR valve of the unapplied EGR system in the judgment, a system error judging unit 400 judging whether the system is erroneous by comparing the measured position of the EGR valve with a predetermined reference position, and a control unit 500 shutting off the applied system when the system error judging unit 400 judges that the system is erroneous.

The engine state measuring unit 100 measures various information regarding a speed of the engine, that is, revolutions per minute (RPM), the fuel quantity, an intake air quantity, a temperature, and the like. In one or a plurality of exemplary embodiments, the engine state measuring unit 100 may include various sensors such as an engine rpm sensor, a fuel quantity sensor, an air quantity measurement sensor, a temperature sensor, and the like to receive various information on the state of the engine therefrom.

In one or the plurality of exemplary embodiments, the engine state measuring unit 100 may be a part configuring an electric control unit (ECU) of a vehicle.

Meanwhile, various information on the state of the engine measured by the engine state measuring unit 100 is transmitted to the application system judging unit 200.

In one or the plurality of exemplary embodiments, the application system judging unit 200 may also be a part configuring the ECU of the vehicle and the application system judging unit 200 determines an EGR system suitable for application between EGR systems configured dually based on the transmitted engine state information.

As an exhaust gas control in Europe and North America is further strengthened, it becomes more important to remove nitrogen oxide (NOx) and a low-pressure (LP) EGR system as well as a high-pressure (HP) EGR system are used dually in order to efficiently control the temperature and flow of recirculation gas (EGR gas). Even in an exemplary embodiment of the present invention, it is presumed that the dual EGR system is used.

The application system judging unit 200 judges whether any system of the high-pressure EGR system and the low-pressure EGR system of the dual EGR system will be applied according to the state of the engine.

Figure 4:
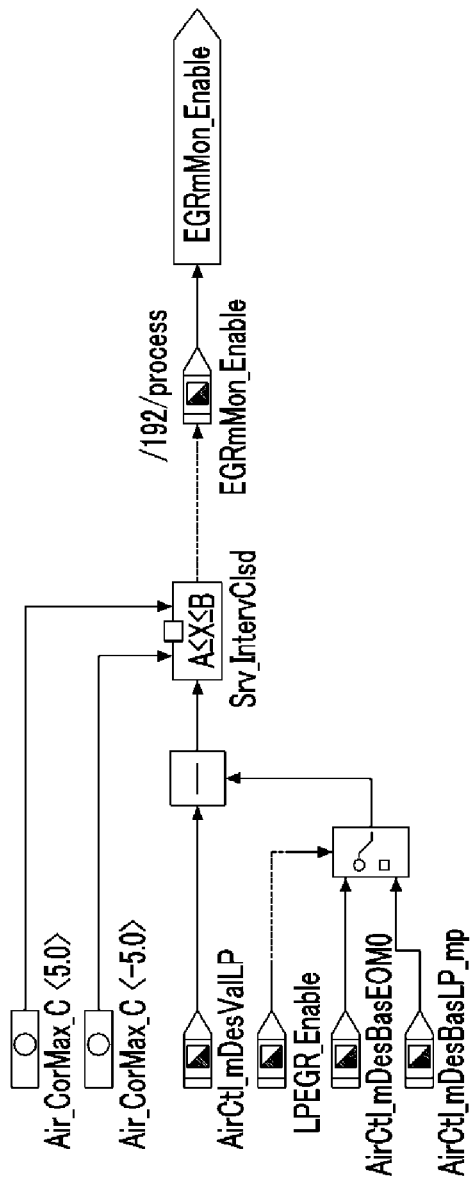
FIG. 4 is a configuration diagram of logic applied with a low-pressure EGR system according to the exemplary embodiment of the present invention.

FIG. 4 is a diagram illustrating a logic configuration regarding an application condition of the low-pressure EGR system in the dual EGR system as an exemplary embodiment.

As illustrated in FIG. 4, it may be determined whether the low-pressure EGR system will be applied by considering states such as the revolutions per minute (RPM) of the engine or the fuel quantity, and the temperature of cooling water and the temperature of outside air and it may be assumed a state in which there are no other errors of the low-pressure EGR system. Meanwhile, since the air quantity is compensated according to the current temperature of the cooling water, the temperature of the outside air, pressure and the like, compensation logic for the air quantity may not be applied thereto. A condition in which the low-pressure EGR system is applied according to various states of the engine may be set in advance.

Even in the high-pressure EGR system, a condition in which the high-pressure EGR system can be applied according to various states of the engine may be set in advance, similarly as the low-pressure EGR system.

The application system judging unit 200 judges whether any one of the low-pressure EGR system and the high-pressure EGR system will be applied by determining the state of the engine.

The valve position measuring unit 300 measures the position of the EGR valve of the EGR system judged as the unapplied EGR system in the judgment by the application system judging unit 200. That is, when the low-pressure EGR system is applied, the position of the EGR valve of the high-pressure EGR system is measured, whereas when the high-pressure EGR system is applied, the position of the EGR valve of the low-pressure EGR system is measured.

In one or the plurality of exemplary embodiments, when the application system judging unit 200 judges that the low-pressure EGR system is applied, the control unit 500 open loop-controls the low-pressure EGR system and the valve position measuring unit 300 deteiinines the position of the EGR valve of the high-pressure EGR system.

In another or the plurality of exemplary embodiments, when the application system judging unit 200 judges that the high-pressure EGR system is applied, the control unit 500 open loop-controls the high-pressure EGR system and the valve position measuring unit 300 determines the position of the EGR valve of the low-pressure EGR system.

For example, since trackability of a high-pressure EGR of the engine is relatively excellent under a low-speed and small-load condition and trackability of a low-pressure EGR is relatively excellent under a high-speed and large-load condition, the control unit 500 may close loop-control the high-pressure EGR and open loop-control the low-pressure EGR in a low-speed and small-load area and close loop-control the low EGR and open loop-control the high-pressure EGR in the high-speed and large-load area, by reflecting the state.

Hereinafter, applying the low-pressure EGR system in the exemplary embodiments of the present invention will be described as an example for ease of description.

Therefore, the control unit 500 open loop-controls the low-pressure EGR system and close loop-controls the high-pressure EGR system and the valve position measuring unit 300 determines the position of the EGR valve of the high-pressure EGR system. Since the high-pressure EGR system is close loop-controlled, the state is fed back to control the EGR valve in real time. Therefore, when the position of the EGR valve of the high-pressure EGR system is determined, it can be seen whether the low-pressure EGR system is normally operated contrary to this. If the low-pressure EGR system has a problem, the position of the EGR valve feedback-controlled in the high-pressure EGR system is different from the position of the EGR valve in a normal state, and thus the position of the EGR valve needs to he determined.

Accordingly, the system error judging unit 400 receives the position of the EGR valve measured by the valve position measuring unit 300 and judges whether the system is erroneous by comparing the received position of the EGR valve with a predetermined reference position.

The predetermined reference position is stored by measuring the position of the EGR valve in advance while the low-pressure EGR system is normally driven and becomes the position of the EGR valve when the system is in a normal state.

Figure 5:
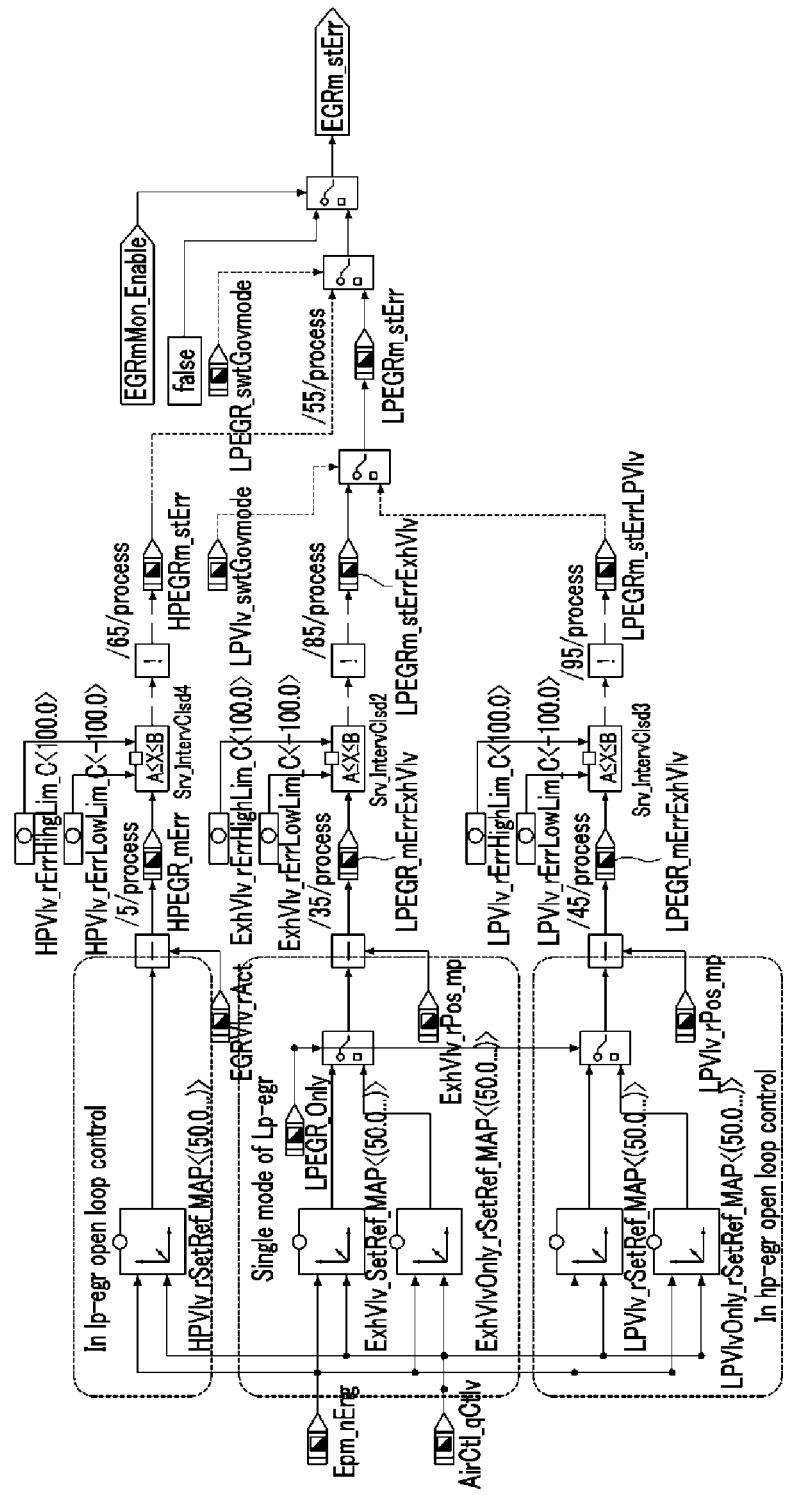
FIG. 5 is a configuration diagram of a duty map of a high-pressure EGR system valve when the system is in a normal state.

In one or the plurality of exemplary embodiments, a duty map of the EGR valve of the high-pressure EGR system may be configured when the low-pressure EGR system is in the normal state as illustrated in FIG. 5.

Figure 6:
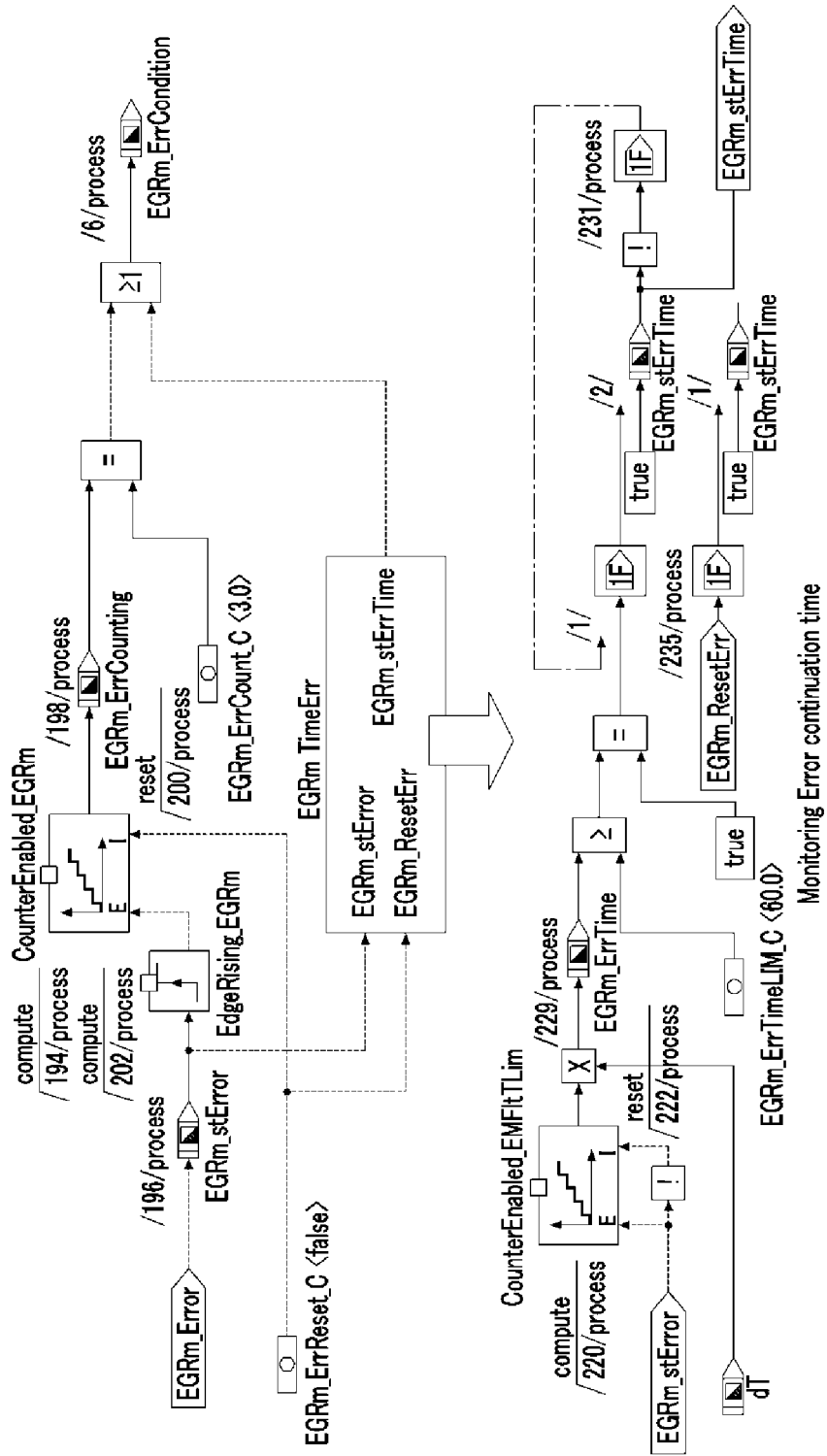
FIG. 6 is a configuration diagram of error detection logic of the system for monitoring exhaust gas recirculation.

In one or the plurality of exemplary embodiments, as illustrated in FIG. 6, the system error judging unit 400 may judge whether a difference between the measured position of the EGR valve and the reference position deviates from a normal range, whether a time when the difference deviates from the normal range is maintained as long as a predetermined time, count, as an error, the case where the time is maintained as long as the predetermined time, and judge that the system is erroneous when the the number of times of error count is more than the limited number of times. Herein, the normal range and the limited number of times may be set in advance through an experiment.

The system error judging unit 400 may judge whether the error situation is healed after the error counting to judge that the system is erroneous even when the error situation is maintained for a predetermined time with the error situation unhealed.

Meanwhile, when the system error judgment unit 400 judges that the system is erroneous, the control unit 500 of the vehicle may take a system protection action by shutting off the system and outputting a predetermined warning.

Hereinafter, a method for monitoring exhaust gas recirculation according to an exemplary embodiment of the present invention will be described with reference to the accompanying drawings.

Figure 3:
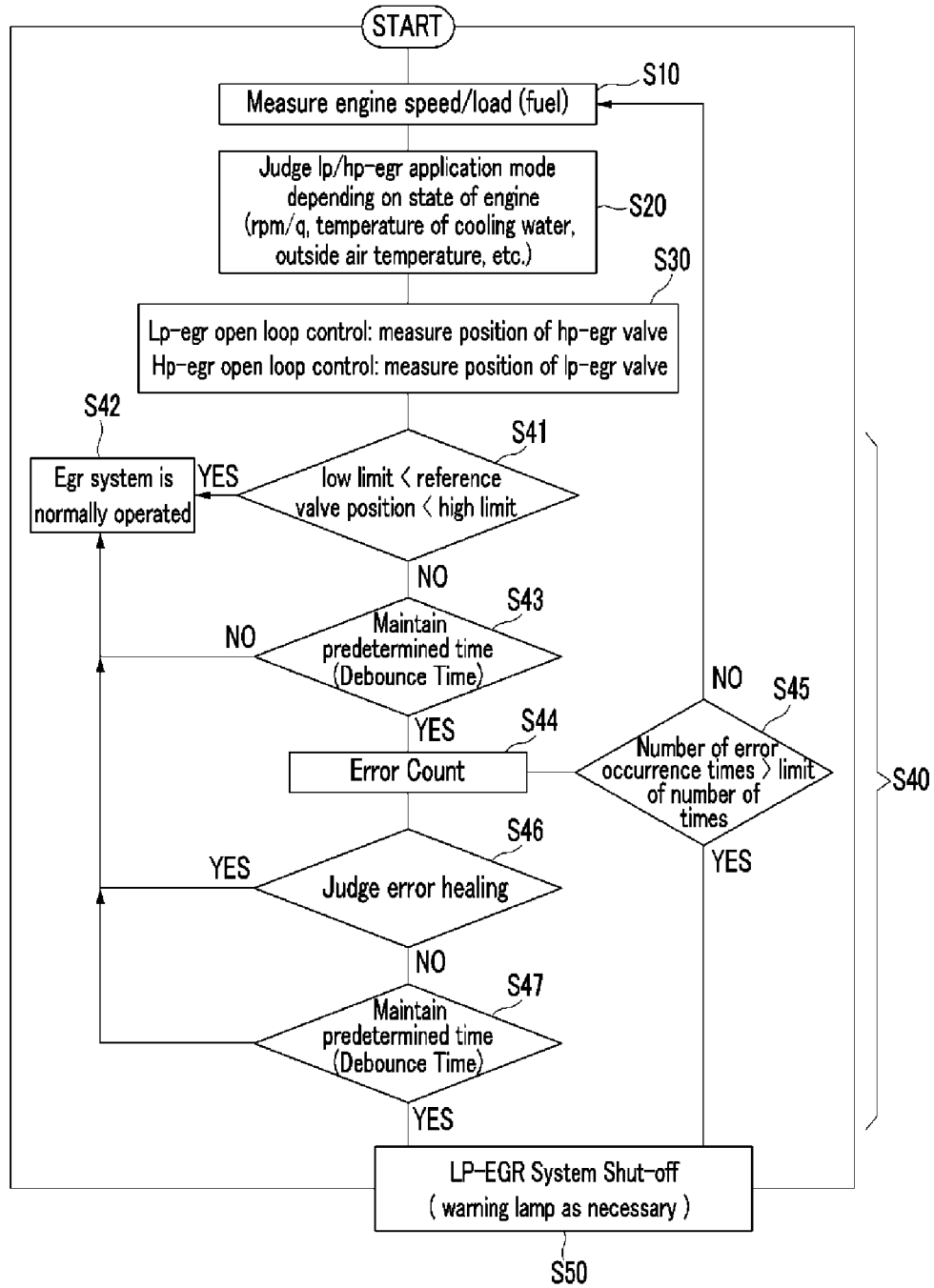
FIG. 3 is a flowchart of a method for monitoring exhaust gas recirculation according to an exemplary embodiment of the present invention.

FIG. 3 is a flowchart of a method for monitoring exhaust gas recirculation according to an exemplary embodiment of the present invention.

As illustrated in FIG. 3, the method for monitoring exhaust gas recirculation according to the exemplary embodiment of the present invention may include (a) measuring a state of an engine including information on rpm of the engine and a fuel quantity (S10), (b) judging an applied EGR system and an unapplied EGR system between a high-pressure EGR system and a low-pressure EGR system according to the measured state of the engine (S20), (c) measuring the position of an EGR valve of the unapplied EGR system in the judgment (S30), (d) judging whether the system is erroneous by comparing the measured position of the EGR valve with a predetermined reference position (S40), and (e) shutting off the applied system when it is judged that the system is erroneous in step (d) (S50).

As illustrated as the exemplary embodiment in FIG. 3, first, (a) the state of the vehicular engine is determined (S10).

In one or a plurality of exemplary embodiments, an engine rpm sensor, a fuel quantity sensor, an air quantity measurement sensor, a temperature sensor, and the like are provided to measure various states such as the rpm of the engine, the fuel quantity, and the like therefrom (S10).

Next, (b) an EGR system to be applied between the high-pressure EGR system and the low-pressure EGR system is determined based on the measured state information of the engine as above (S20).

In addition, (c) when the applied EGR system is judged, the EGR system is open loop-controlled, an unapplied EGR system is close loop-controlled, and the position of an EGR valve of the unapplied EGR system is measured (S30). Hereinafter, applying the low-pressure EGR system will be described for ease of description. Therefore, in step (c), the low EGR system is open loop-controlled, the high-pressure EGR system is close loop-controlled, and the position of the EGR valve of the high-pressure EGR system is measured.

Next, (d) the measured position of the high-pressure EGR valve is compared with a reference position in a normal state to judge whether the low-pressure EGR system is erroneous (S40). When any one of the low-pressure EGR system and the high-pressure EGR system is erroneous, the error has an effect on the other one. Since the low-pressure EGR system is open loop-controlled and the high-pressure EGR system is close loop-controlled in the exemplary embodiment, when the low-pressure EGR system is erroneous, the control of the EGR valve of the close loop-controlled high-pressure EGR system is influenced, and as a result, the position of the EGR valve of the high-pressure EGR system deviates from the normal position of the EGR valve. Accordingly, by determining the situation in step (d), it is judged whether the low-pressure EGR system is erroneous.

In one or the plurality of exemplary embodiments, as illustrated in FIG. 3, step (d) (S40) may include judging whether a difference between the measured position of the EGR valve and the reference position deviates from a normal range (S41), judging whether a time when the difference deviates from the normal range is maintained as long as a predetermined time (S43), counting, as an error, a case where the time is maintained as long as the predetermined time (S44), and judging that the system is erroneous when the number of times of error count is more than the limited number of times (S45).

It is judged whether the difference between the position of the high-pressure EGR valve and the reference position is within a predetermined range (S41), and when the difference is within the range, it is judged that the low-pressure EGR system is normal (S42) and thereafter, the process returns to step (a). On the contrary, when the difference deviates from the predetermined range, it is judged again whether a time when the difference deviates from the predetermined range is maintained as long as a predetermined time (S43), and a case where the time is maintained as long as the predetermined time is counted as the error. It is judged whether the the number of times of error count is more than the limited number of times (S45), and when the number of times of error count is not more than the limited number of times, the process returns to step (a), and when the number of times of error count is more than the limited number of times, it is judged that the low-pressure EGR system is erroneous (S50).

It may be determined that the system is erroneous immediately when only one-time error occurs, but since reliability of the monitoring method of the present invention may still deteriorate in that case, whether the system is erroneous is monitored with reliability by setting the number of error occurrence times or an error occurrence time. For example, it is finally judged that the low-pressure EGR system is erroneous only when the error occurrence time is short, but the number of error occurrence times is more than the limited maximum number of times or contrary to this, the number of error occurrence times is small, but a continuation time of the error is maintained for a limited predetermined time or more. Therefore, the reliability of the monitoring method of the present invention can be improved.

Further, in one or the plurality of exemplary embodiments, step (d) may further include judging whether the error situation is healed after the error counting (S46) and judging that the system is erroneous when error situation is maintained for a predetermined time with the error situation unhealed (S47), as illustrated in FIG. 3.

Meanwhile, (e) when it is finally judged that the system is erroneous in the judgment of step (d), a system protection action may be taken by shutting off the applied low-pressure EGR system and outputting a predetermined warning (S50).

As described above, according to the system 10 for monitoring exhaust gas recirculation according to the exemplary embodiment of the present invention, when the low-pressure EGR system and the high-pressure EGR system are used as the dual system, it is possible to rapidly and accurately judge whether the low-pressure EGR system is normally operated by measuring the position of the EGR valve of the high-pressure EGR system contrary to this in the case of applying the low-pressure EGR system. By determining the position of the EGR valve of the low-pressure EGR system when the high-pressure EGR system is operated, it is possible to rapidly and accurately determine whether the high-pressure EGR system is normally operated.

Figure 7:
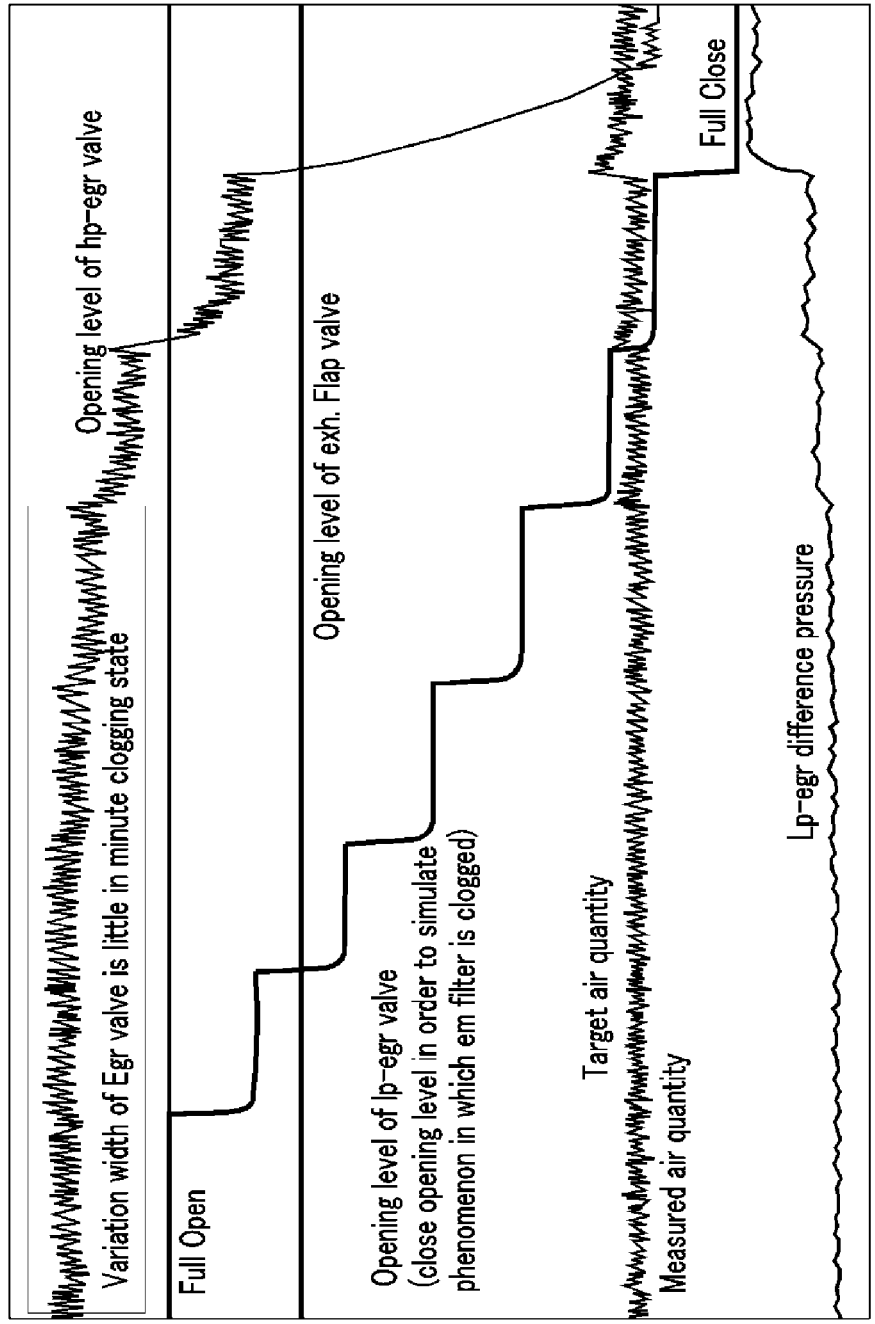
FIG. 7 is an experimental graph of a principle of the method and system for monitoring exhaust gas recirculation according to the exemplary embodiment of the present invention.
Figure 8:
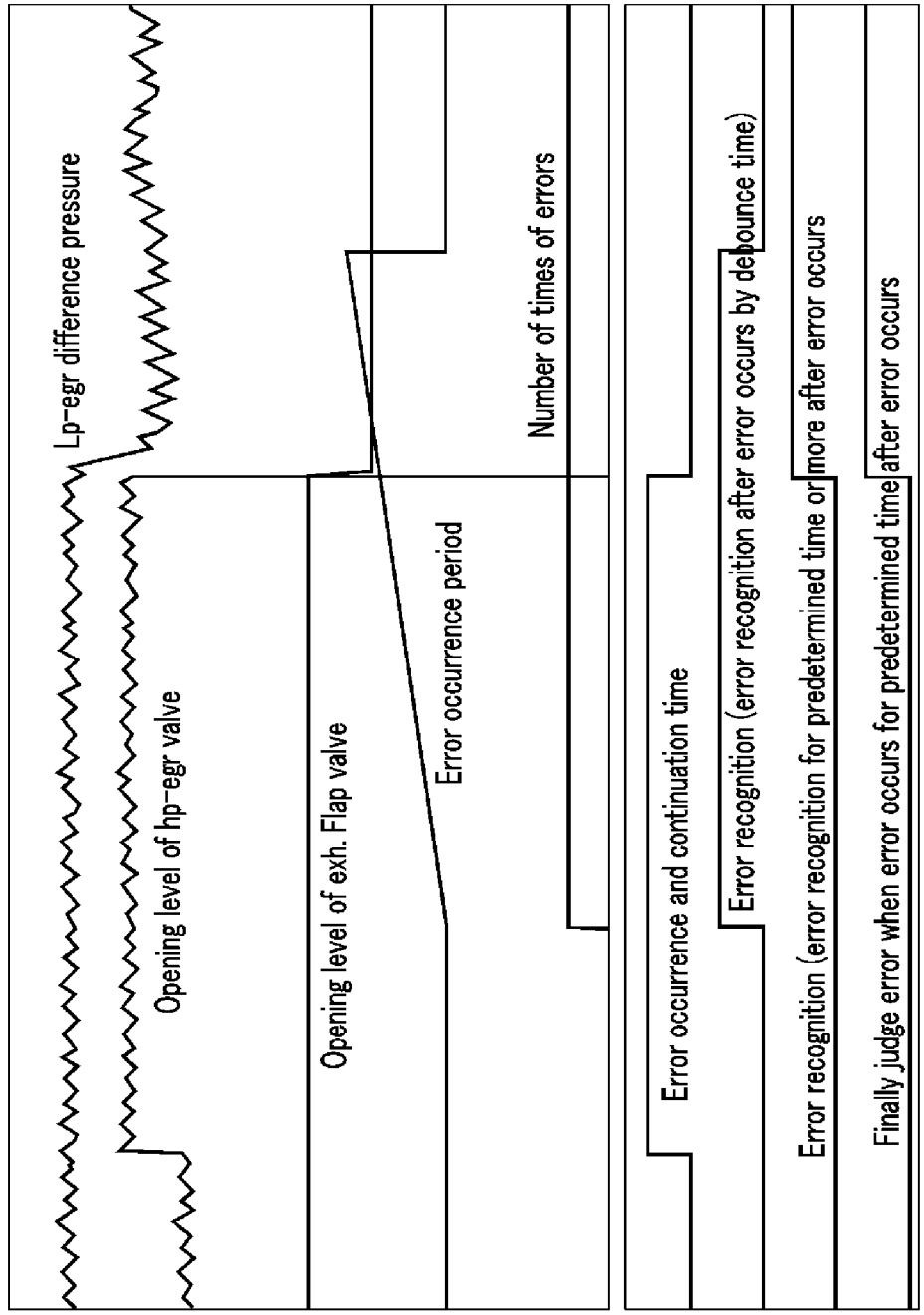
FIG. 8 is an experimental graph of the method and system for monitoring exhaust gas recirculation according to the exemplary embodiment of the present invention in association with an error occurrence time.
Figure 9:
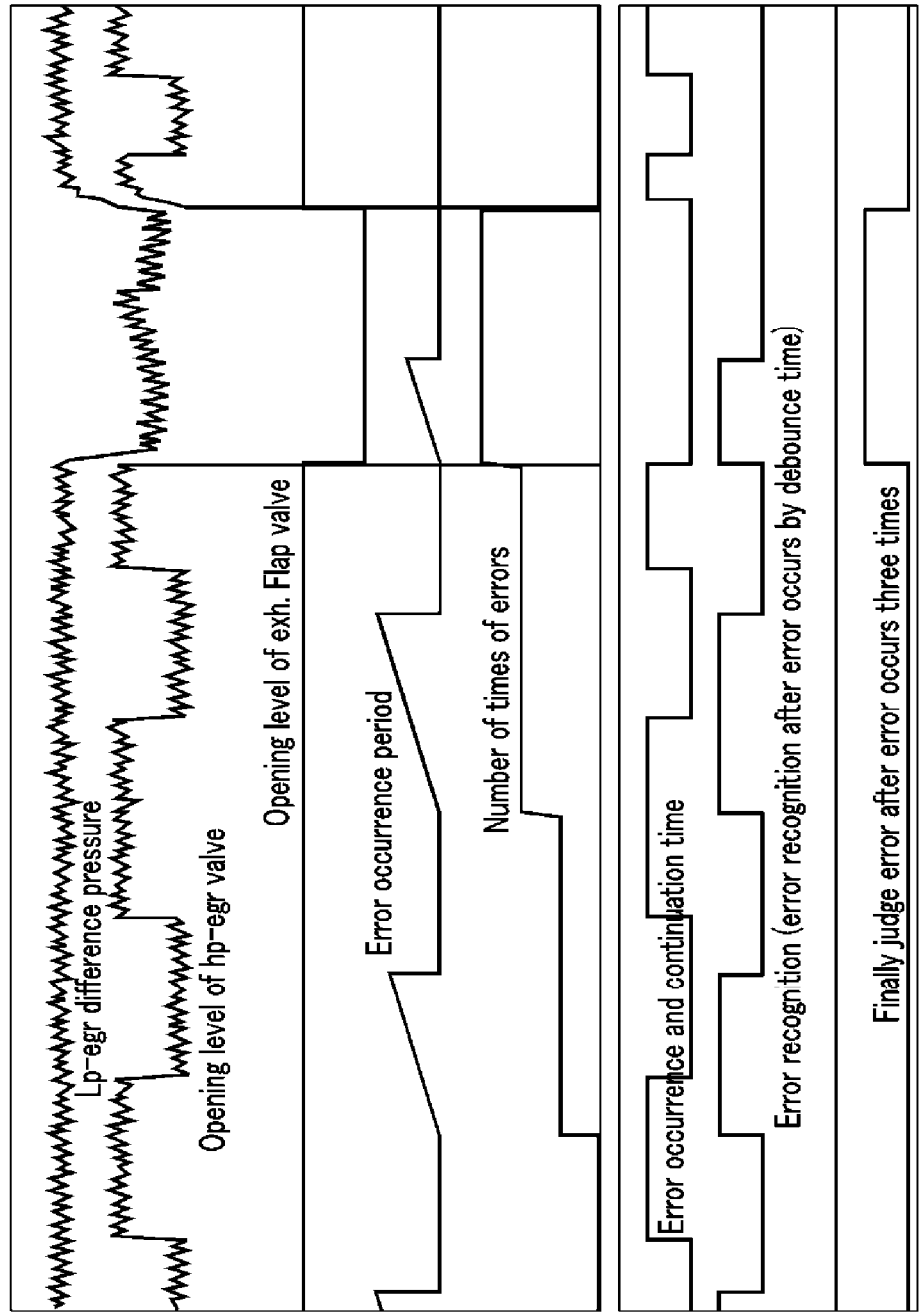
FIG. 9 is an experimental graph of the method and system for monitoring exhaust gas recirculation according to the exemplary embodiment of the present invention in association with the number of error occurrence times.

FIGS. 7 to 9 are experimental graphs of the method and system for monitoring exhaust gas recirculation according to the exemplary embodiment of the present invention. As illustrated in FIG. 7, when an erroneous situation occurs, such as a situation where the valve of the low-pressure EGR system is clogged, an opening level of the EGR valve of the high-pressure EGR system is adjusted by reflecting the erroneous situation, and as a result, it is possible to determine whether the low-pressure EGR system is erroneous by determining the position of the high-pressure EGR valve. As illustrated in FIG. 8, when the number of error occurrence times is one, but the error occurrence time is continued for a predetermined time or more, it may be finally judged that the EGR system is erroneous. As illustrated in FIG. 9, even when the error occurrence continuation time is short, but the number of error occurrence times is three or more, it may be finally judged that the EGR system is erroneous.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for monitoring exhaust gas recirculation in a dual EGR system, comprising:
   (a) measuring a state of an engine including information on rpm of the engine and a fuel quantity;
   (b) judging an applied EGR system and an unapplied EGR system between a high-pressure EGR system and a low-pressure EGR system according to the measured state of the engine;
   (c) measuring a position of an EGR valve of the unapplied EGR system when the applied EGR is judged; and
   (d) judging whether the system is erroneous by comparing a measured position of the EGR valve with a predetermined reference position.

2. The method of claim 1, further comprising:
   (e) shutting off the applied system when the system is judged to be erroneous in step (d).

3. The method of claim 2, wherein:
   a predetermined warning is outputted when it is judged that the system is erroneous in step (e).

4. The method of claim 1, wherein:
   the applied EGR system is open loop-controlled according to the judgment of step (b).

5. The method of claim 1, wherein:
   step (d) includes judging whether a difference between the measured position of the EGR valve and the predetermined reference position deviates from a normal range, judging whether a time when the difference deviates from the normal range is maintained as long as a predetermined time, counting, as an error, a case where the time is maintained as long as the predetermined time, and judging the EGR system in an error situation when the number of times of error count is more than a predetermined number of times.

6. The method of claim 5, wherein:
   step (d) further includes judging whether the error situation is healed after the error counting and judging that the system is erroneous when the error situation is maintained for a predetermined time with the error situation unhealed.

7. A system for monitoring exhaust gas recirculation in a dual EGR system, comprising:
   an engine state measuring unit measuring a state of an engine including information on rpm of the engine and a fuel quantity;
   an application system judging unit judging an applied EGR system and an unapplied EGR system between a high-pressure EGR system and a low-pressure EGR system according to the measured state of the engine;
   a valve position measuring unit measuring a position of an EGR valve of the unapplied EGR system when the applied EGR is judged; and
   a system error judging unit judging whether the system is erroneous by comparing the measured position of the EGR valve with a predetermined reference position.

8. The system of claim 7, further comprising:
   a control unit shutting off the applied EGR system when the system error judging unit judges that the system is erroneous.

9. The system of claim 8, wherein:
   the control unit open loop-controls the applied EGR system according to a judgment of the application system judging unit.

10. The system of claim 8, wherein:
    a predetermined warning is outputted when the system error judging unit judges that the system is erroneous.

11. The system of claim 7, wherein:
    the system error judging unit judges whether a difference between the measured position of the EGR valve and the predetermined reference position deviates from a normal range, judges whether a time when the difference deviates from the normal range is maintained as long as a predetermined time, counts, as an error, a case where the time is maintained as long as the predetermined time, and judges the EGR system in an error situation when the number of times of error count is more than a predetermined number of times.

12. The system of claim 11, wherein:
    the system error judging unit judges whether the error situation is healed after the error counting and judges that the system is erroneous when the error situation is maintained for a predetermined time with the error situation unhealed.

* * * * *